(12) United States Patent
Ohta et al.

(10) Patent No.: US 11,849,490 B2
(45) Date of Patent: Dec. 19, 2023

(54) COMMUNICATION DEVICE, SECOND COMMUNICATION DEVICE, COMMUNICATION SYSTEM, AND COMMUNICATION METHOD

(71) Applicant: FUJITSU LIMITED, Kawasaki (JP)

(72) Inventors: Yoshiaki Ohta, Yokohama (JP); Nobuhisa Aoki, Kawasaki (JP); Yoshihiro Kawasaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 265 days.

(21) Appl. No.: 17/401,490

(22) Filed: Aug. 13, 2021

(65) Prior Publication Data
US 2021/0378029 A1 Dec. 2, 2021

Related U.S. Application Data

(63) Continuation of application No. PCT/JP2019/006716, filed on Feb. 22, 2019.

(51) Int. Cl.
*H04W 74/08* (2009.01)
*H04W 74/00* (2009.01)
*H04W 80/02* (2009.01)

(52) U.S. Cl.
CPC ..... *H04W 74/0841* (2013.01); *H04W 74/002* (2013.01); *H04W 80/02* (2013.01)

(58) Field of Classification Search
CPC .......... H04W 74/0841; H04W 74/002; H04W 74/0833; H04W 74/006; H04W 80/02; H04W 28/08; H04W 72/1273
USPC ................................................. 370/329–330
See application file for complete search history.

(56) References Cited

U.S. PATENT DOCUMENTS

| | | |
|---|---|---|
| 2006/0292992 A1 | 12/2006 | Tajima et al. |
| 2017/0013647 A1 | 1/2017 | Uchino et al. |
| 2018/0206290 A1 | 7/2018 | Dai |
| 2018/0270869 A1* | 9/2018 | Tsai ............... H04W 74/006 |
| 2018/0279186 A1* | 9/2018 | Park ............... H04W 36/30 |
| 2018/0279375 A1* | 9/2018 | Jeon .............. H04W 72/23 |

(Continued)

FOREIGN PATENT DOCUMENTS

| | | |
|---|---|---|
| EP | 3 641 476 A1 | 4/2020 |
| JP | 2007-6080 A | 1/2007 |

(Continued)

OTHER PUBLICATIONS

First Notification of Office Action and Search Report issued by the China National Intellectual Property Administration for Chinese Patent Application No. 201980091558.6, dated May 25, 2023, with an English translation.

(Continued)

*Primary Examiner* — Candal Elpenord
(74) *Attorney, Agent, or Firm* — Myers Wolin, LLC

(57) ABSTRACT

A communication device that performs a random access procedure, the communication device includes a transmitter and a controller. The transmitter configured to transmit a first signal in the random access procedure and a second signal which is not a signal of the random access procedure. The controller configured to perform control so that first information included in a first subheader corresponding to the first signal is included in a second subheader corresponding to the second signal and is transmitted.

10 Claims, 19 Drawing Sheets

(56) References Cited

U.S. PATENT DOCUMENTS

| | | | |
|---|---|---|---|
| 2020/0178318 A1 | 6/2020 | Yu et al. | |
| 2020/0221504 A1* | 7/2020 | Cirik | H04W 72/04 |
| 2020/0229241 A1* | 7/2020 | Jeon | H04W 74/0833 |

FOREIGN PATENT DOCUMENTS

| | | |
|---|---|---|
| JP | 2015-142373 A | 8/2015 |
| JP | 2018-518117 A | 7/2018 |
| WO | 2010/077004 A2 | 7/2010 |
| WO | 2011/129226 A1 | 10/2011 |
| WO | 2016/204985 A1 | 12/2016 |
| WO | 2017/133565 A1 | 8/2017 |
| WO | 2018/204863 A1 | 11/2018 |
| WO | 2019/029300 A1 | 2/2019 |

OTHER PUBLICATIONS

Extended European search report with the supplementary European search report and the European search opinion Issued by the European Patent Office for corresponding European Patent Application No. 19916122.5-1215, dated Feb. 3, 2022.

International Search Report issued by the Japan Patent Office for corresponding International Patent Application No. PCT/JP2019/006716, dated Apr. 9, 2019, with an English translation.

Mediatek Inc., "2-step RACH msgA and msgB contents", Agenda Item: 11.2.1.1, 3GPP TSG-RAN WG2 Meeting #104, R2-1816685, Spokane, US, Nov. 12-16, 2018.

3GPP TS 36.133 V15.5.0, "3rd Generation Partnership Project; Technical Specification Group Radio Access Network; Evolved Universal Terrestrial Radio Access (E-UTRA); Requirements for support of radio resource management (Release 15)", Dec. 2018.

3GPP TS 36.211 V15.4.0, "3rd Generation Partnership Project; Technical Specification Group Radio Access Network; Evolved Universal Terrestrial Radio Access (E-UTRA); Physical channels and modulation (Release 15)", Dec. 2018.

3GPP TS 36.212 V15.4.0, "3rd Generation Partnership Project; Technical Specification Group Radio Access Network; Evolved Universal Terrestrial Radio Access (E-UTRA); Multiplexing and channel coding (Release 15)", Dec. 2018.

3GPP TS 36.213 V15.4.0, "3rd Generation Partnership Project; Technical Specification Group Radio Access Network; Evolved Universal Terrestrial Radio Access (E-UTRA); Physical layer procedures (Release 15)", Dec. 2018.

3GPP TS 36.300 V15.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Dec. 2018.

3GPP TS 36.321 V15.4.0, "3rd Generation Partnership Project; Technical Specification Group Radio Access Network; Evolved Universal Terrestrial Radio Access (E-UTRA); Medium Access Control (MAC) protocol specification (Release 15)", Dec. 2018.

3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.

3GPP TS 36.323 V15.2.0, "3rd Generation Partnership Project; Technical Specification Group Radio Access Network; Evolved Universal Terrestrial Radio Access (E-UTRA); Packet Data Convergence Protocol (PDCP) specification (Release 15)", Dec. 2018.

3GPP TS 36.331 V15.4.0, "3rd Generation Partnership Project; Technical Specification Group Radio Access Network; Evolved Universal Terrestrial Radio Access (E-UTRA); Radio Resource Control (RRC); Protocol specification (Release 15)", Dec. 2018.

3GPP TS 36.413 V15.4.0, "3rd Generation Partnership Project; Technical Specification Group Radio Access Network; Evolved Universal Terrestrial Radio Access Network (E-UTRAN); S1 Application Protocol (S1AP) (Release 15)", Dec. 2018.

3GPP TS 36.423 V15.4.0, "3rd Generation Partnership Project; Technical Specification Group Radio Access Network; Evolved Universal Terrestrial Radio Access Network (E-UTRAN); X2 application protocol (X2AP) (Release 15)", Dec. 2018.

3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.

3GPP TS 37.340 V15.4.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2018.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.4.0, "3rd Generation Partnership Project; Technical Specification Group Radio Access Network; NR; Services provided by the physical layer (Release 15)", Dec. 2018.

3GPP TS 38.211 V15.4.0, "3rd Generation Partnership Project; Technical Specification Group Radio Access Network; NR; Physical channels and modulation (Release 15)", Dec. 2018.

3GPP TS 38.212 V15.4.0, "3rd Generation Partnership Project; Technical Specification Group Radio Access Network; NR; Multiplexing and channel coding (Release 15)", Dec. 2018.

3GPP TS 38.213 V15.4.0, "3rd Generation Partnership Project; Technical Specification Group Radio Access Network; NR; Physical layer procedures for control (Release 15)", Dec. 2018.

3GPP TS 38.214 V15.4.0, "3rd Generation Partnership Project; Technical Specification Group Radio Access Network; NR; Physical layer procedures for data (Release 15)", Dec. 2018.

3GPP TS 38.215 V15.4.0, "3rd Generation Partnership Project; Technical Specification Group Radio Access Network; NR; Physical layer measurements (Release 15)", Dec. 2018.

3GPP TS 38.300 V15.4.0, "3rd Generation Partnership Project; Technical Specification Group Radio Access Network; NR; NR and NG-RAN Overall Description; Stage 2 (Release 15)", Dec. 2018.

3GPP TS 38.321 V15.4.0, "3rd Generation Partnership Project; Technical Specification Group Radio Access Network; NR; Medium Access Control (MAC) protocol specification (Release 15)", Dec. 2018.

3GPP TS 38.322 V15.4.0, "3rd Generation Partnership Project; Technical Specification Group Radio Access Network; NR; Radio Link Control (RLC) protocol specification (Release 15)", Dec. 2018.

3GPP TS 38.323 V15.4.0, "3rd Generation Partnership Project; Technical Specification Group Radio Access Network; NR; Packet Data Convergence Protocol (PDCP) specification (Release 15)", Dec. 2018.

3GPP TS 38.331 V15.4.0, "3rd Generation Partnership Project; Technical Specification Group Radio Access Network; NR; Radio Resource Control (RRC) protocol specification (Release 15)", Dec. 2018.

3GPP TS 38.401 V15.4.0, "3rd Generation Partnership Project; Technical Specification Group Radio Access Network; NG-RAN; Architecture description (Release 15)", Dec. 2018.

3GPP TS 38.410 V15.2.0, "3rd Generation Partnership Project; Technical Specification GroupRadio Access Network; NG-RAN; NG general aspects and principles (Release 15)", Dec. 2018.

3GPP TS 38.413 V15.2.0, "3rd Generation Partnership Project; Technical Specification Group Radio Access Network; NG-RAN; NG Application Protocol (NGAP) (Release 15)", Dec. 2018.

3GPP TS 38.420 V15.2.0, "3rd Generation Partnership Project; Technical Specification Group Radio Access Network; NG-RAN; Xn general aspects and principles (Release 15)", Dec. 2018.

3GPP TS 38.423 V15.2.0, "3rd Generation Partnership Project; Technical Specification Group Radio Access Network; NG-RAN; Xn application protocol (XnAP) (Release 15)", Dec. 2018.

3GPP TS 38.470 V15.4.0, "3rd Generation Partnership Project; Technical Specification Group Radio Access Network; NG-RAN; F1 general aspects and principles (Release 15)", Dec. 2018.

3GPP TS 38.473 V15.4.1, "3rd Generation Partnership Project; Technical Specification Group Radio Access Network; NG-RAN; F1 application protocol (F1AP) (Release 15)", Jan. 2019.

(56) References Cited

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V15.0.0, "3rd Generation Partnership Project; Technical Specification Group Radio Access Network; Study on channel model for frequency spectrum above 6 GHZ (Release 15)", Jun. 2018.

3GPP TR 38.912 V15.0.0, "3rd Generation Partnership Project; Technical Specification Group Radio Access Network; Study on New Radio (NR) access technology (Release 15)", Jun. 2018.

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

3GPP TR 38.889 V16.0.0, "3rd Generation Partnership Project; Technical Specification Group Radio Access Network; Study on NR-based access to unlicensed spectrum (Release 16)", Dec. 2018.

Notice of Reasons for Refusal issued by the Japan Patent Office for corresponding Japanese Patent Application No. 2021-501246, dated May 24, 2022, with an English machine translation.

* cited by examiner

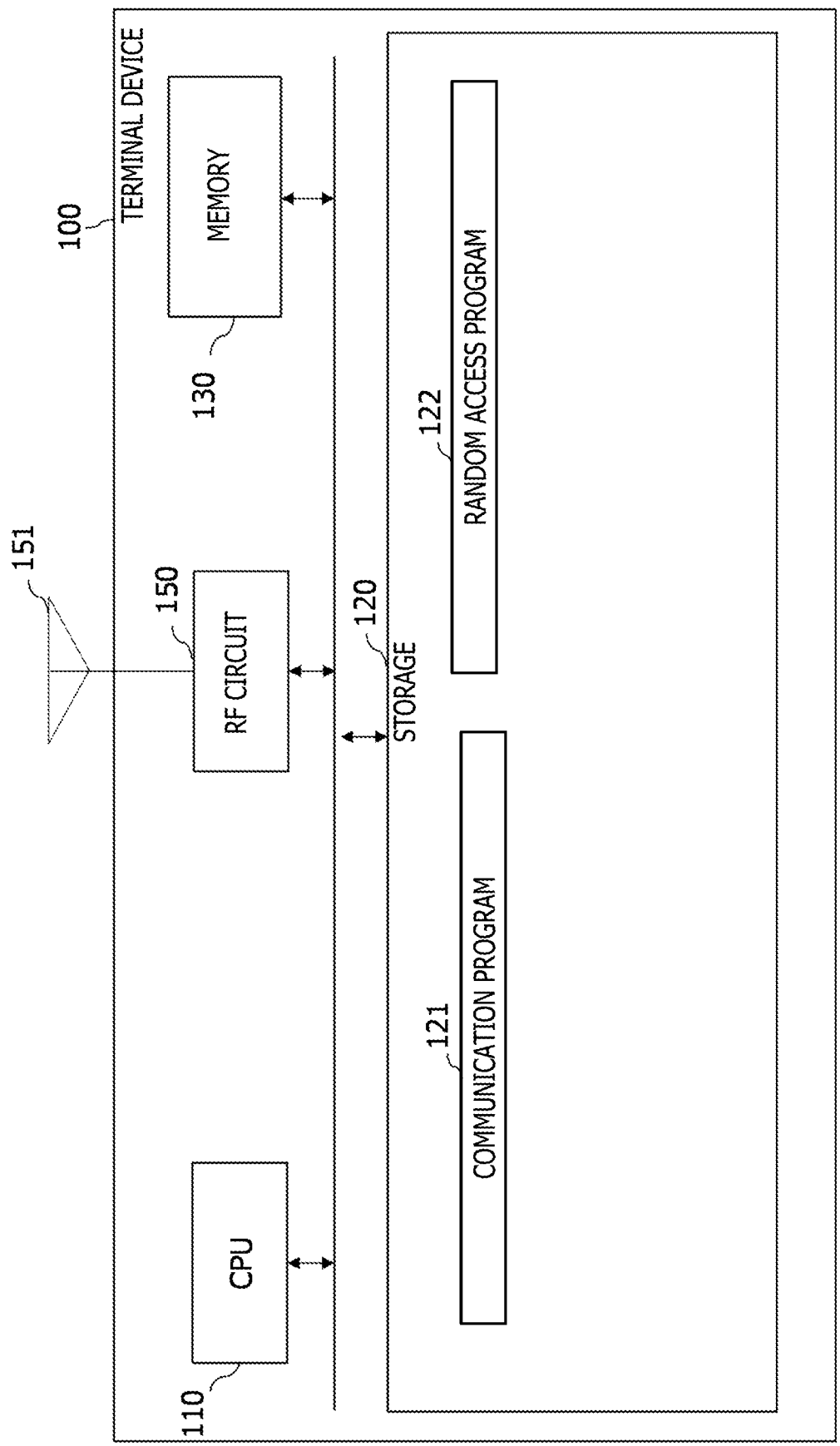

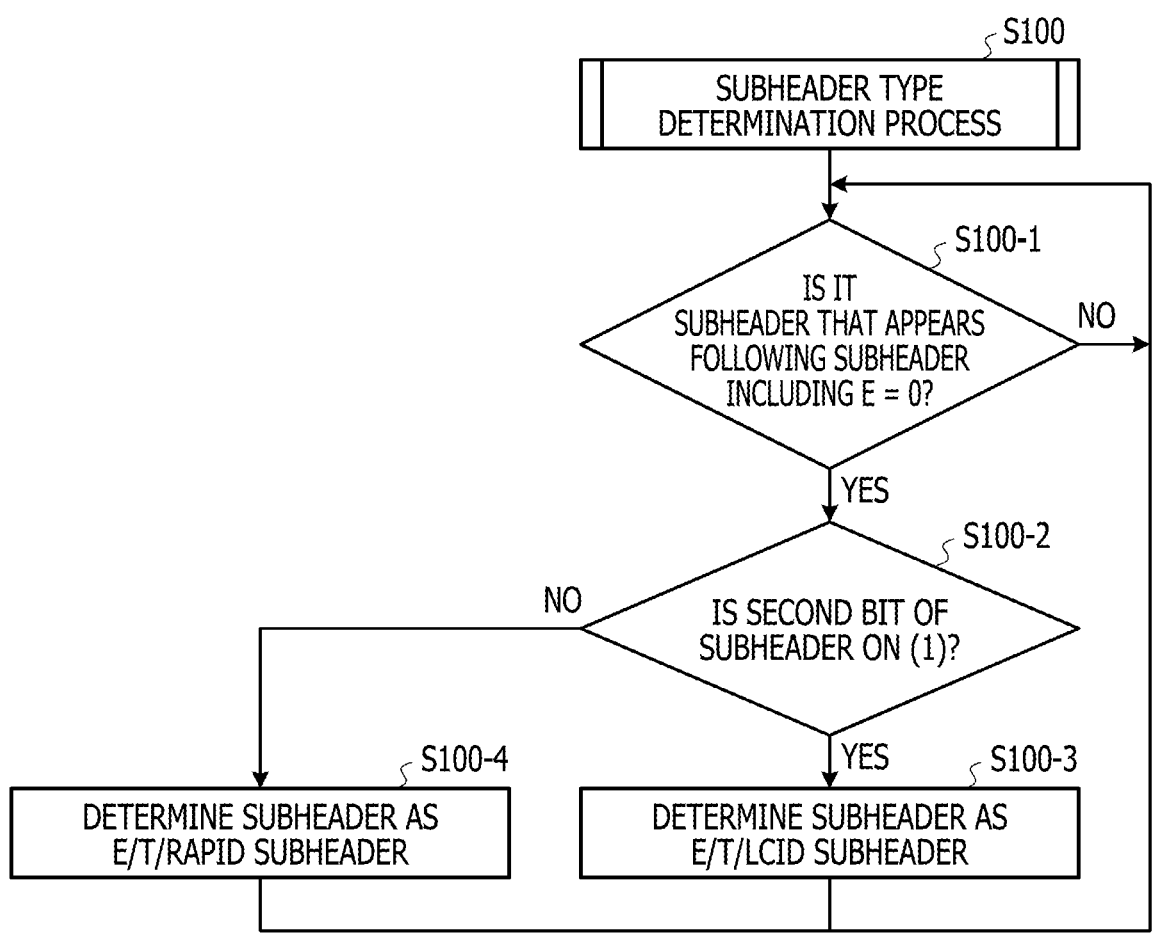

FIG. 19

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved 0 |
| 15 | Reserved |

COMMUNICATION DEVICE, SECOND COMMUNICATION DEVICE, COMMUNICATION SYSTEM, AND COMMUNICATION METHOD

CROSS-REFERENCE TO RELATED APPLICATION

This application is a continuation application of International Application PCT/JP2019/006716 filed on Feb. 22, 2019 and designated the U.S., the entire contents of which are incorporated herein by reference.

FIELD

The embodiments discussed herein are related to a communication device, a second communication device, a communication system, and a communication method.

BACKGROUND

In a current communication network, the traffic of mobile terminals (smartphones and feature phones) accounts for a majority of communication network resources. Furthermore, the traffic used by mobile terminals tend to expand.

Meanwhile, in the communication network, with the development of evolution of Internet of Things (IoT) services (e.g., monitoring systems such as a traffic system, a smart meter, and a device), it has been demanded to cope with services including various requirement. Consequently, in the communication standards for the 5th generation mobile communication (5G or new radio (NR)), it has been demanded that, in addition to standard techniques of the 4th generation mobile communication (4G), techniques, which achieve a higher data rate, a larger capacity, and lower latency. Note that, in the 5th generation communication standards, 3GPP working groups (such as, e.g., TSG-RAN WG1 and TSG-RAN WG2)) have been making a progress on technical study and the first version was released in December 2017.

In order to support various kinds of services as described above, the 5G is assumed to support many use cases categorized, e.g., enhanced mobile broadband (eMBB), massive machine type communications (MTC), and ultra-reliable and low latency communication (URLLC).

In a wireless communication system, a channel for first transmission by a communication device (for example, a terminal device) at the start of communication between a base station device and the communication device is prepared. In the 3GPP, this channel is called a random access channel (RACH), and a communication start procedure using the RACH is called a random access procedure. The RACH includes information called a preamble as information for a base station to identify a radio signal transmitted by the communication device. This information enables the base station device to identify the terminal device.

Note that the random access procedure is performed in a case of executing an initial access, a case where a data signal is generated, a case of establishing a synchronous state during handover, or other cases.

In the wireless communication system, the random access procedure is performed to establish a synchronous state (uplink synchronous state), and data communication is then performed.

The technologies related to the 5G are described in the following citation list.

Related techniques are disclosed in for example 3GPP TS 36.133 V15.5.0 (2018-12), 3GPP TS 36.211 V15.4.0 (2018-12), 3GPP TS 36.212 V15.4.0 (2018-12), 3GPP TS 36.213 V15.4.0 (2018-12), 3GPP TS 36.300 V15.4.0 (2018-12), 3GPP TS 36.321 V15.4.0 (2018-12), 3GPP TS 36.322 V15.1.0 (2018-07), 3GPP TS 36.323 V15.2.0 (2018-12), 3GPP TS 36.331 V15.4.0 (2018-12), 3GPP TS 36.413 V15.4.0 (2018-12), 3GPP TS 36.423 V15.4.0 (2018-12), 3GPP TS 36.425 V15.0.0 (2018-06), 3GPP TS 37.340 V15.4.0 (2018-12), 3GPP TS 38.201 V15.0.0 (2017-12), 3GPP TS 38.202 V15.4.0 (2018-12), 3GPP TS 38.211 V15.4.0 (2018-12), 3GPP TS 38.212 V15.4.0 (2018-12), 3GPP TS 38.213 V15.4.0 (2018-12), 3GPP TS 38.214 V15.4.0 (2018-12), 3GPP TS 38.215 V15.4.0 (2018-12), 3GPP TS 38.300 V15.4.0 (2018-12), 3GPP TS 38.321 V15.4.0 (2018-12), 3GPP TS 38.322 V15.4.0 (2018-12), 3GPP TS 38.323 V15.4.0 (2018-12), 3GPP TS 38.331 V15.4.0 (2018-12), 3GPP TS 38.401 V15.4.0 (2018-12), 3GPP TS 38.410 V15.2.0 (2018-12), 3GPP TS 38.413 V15.2.0 (2018-12), 3GPP TS 38.420 V15.2.0 (2018-12), 3GPP TS 38.423 V15.2.0 (2018-12), 3GPP TS 38.470 V15.4.0 (2018-12), 3GPP TS 38.473 V15.4.1 (2019-01), 3GPP TR 38.801 V14.0.0 (2017-03), 3GPP TR 38.802 V14.2.0 (2017-09), 3GPP TR 38.803 V14.2.0 (2017-09), 3GPP TR 38.804 V14.0.0 (2017-03), 3GPP TR 38.900 V15.0.0 (2018-06), 3GPP TR 38.912 V15.0.0 (2018-06), 3GPP TR 38.913 V15.0.0 (2018-06), and 3GPP TR 38.889 V16.0.0 (2018-12).

SUMMARY

According to an aspect of the embodiments, a communication device that performs a random access procedure, the communication device includes: a transmitter configured to transmit a first signal in the random access procedure and a second signal which is not a signal of the random access procedure; and a controller configured to perform control so that first information included in a first subheader corresponding to the first signal is included in a second subheader corresponding to the second signal and is transmitted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating a structure example of a terminal device 100;

FIG. 14 is a diagram illustrating an example of a process flowchart of a subheader type determination process S100;

FIG. 19 is a diagram illustrating an example of parameters of backoff parameter values.

DESCRIPTION OF EMBODIMENTS

There is a demand to reduce a delay time of data signal communication in the wireless communication system. For example, there is a case where the delay time when the wireless communication system is able to support URLLC services assumed in the 5G is demanded. Therefore, for example, reducing the delay time until data signal transmission is demanded even when a data signal is generated in a situation where the communication device and the base station device are out of synchronization.

The disclosed technology is to provide a communication device, a second communication device, a communication system, and a communication method that reduces a delay time until data signal transmission.

Hereinafter, the present embodiments will be described in detail with reference to the drawings. The problems and the embodiments in the present specification are merely examples, and do not limit the scope of the present application. In particular, as long as the described expressions are technically comparable even if different described expressions are used, the techniques of the present application may be applied to the different described expressions, and the scope of rights is not limited thereby.

First Embodiment

A first embodiment is described below.

Figure 1:
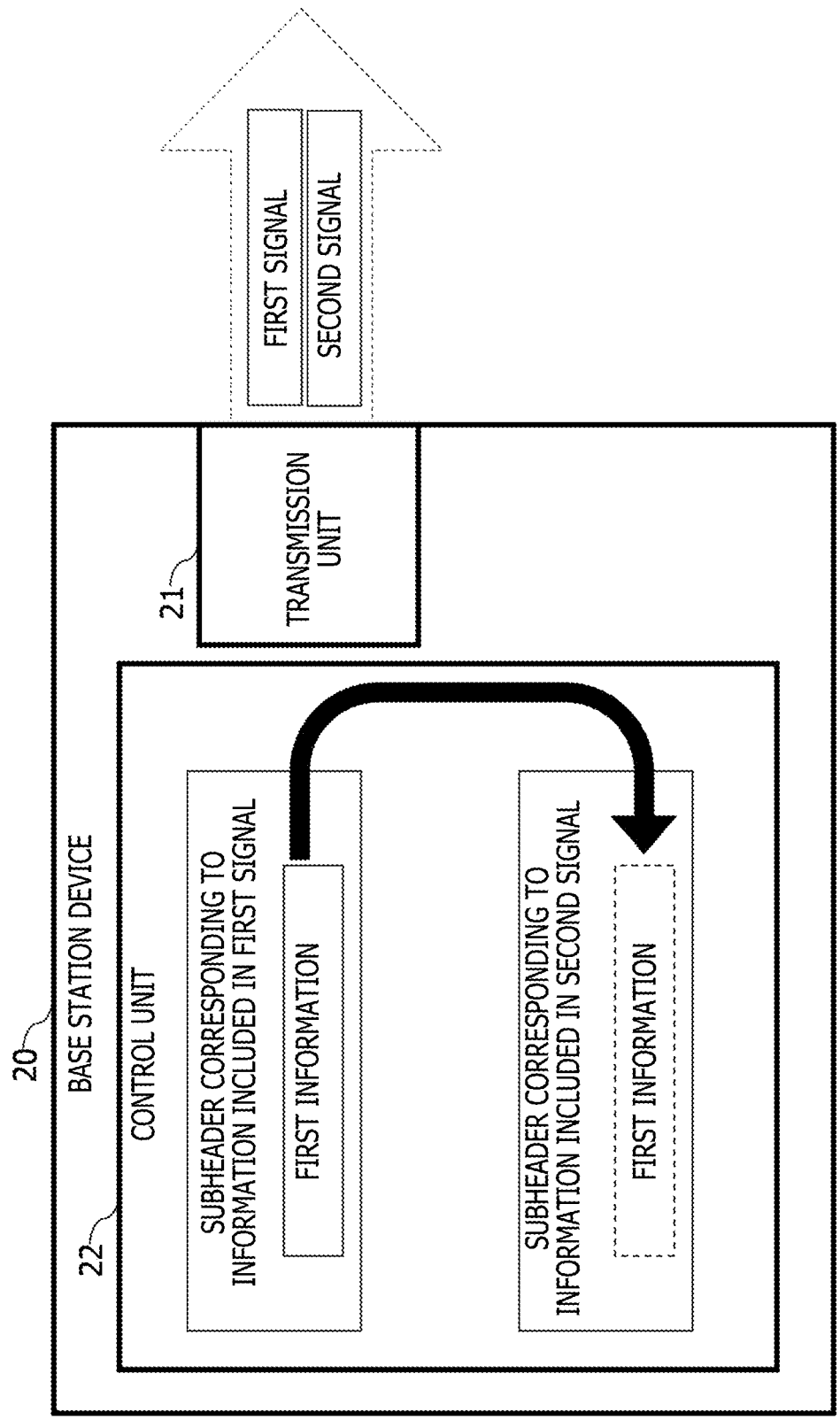
FIG. 1 illustrates a structure example of a base station device 20.

FIG. 1 is a diagram illustrating a structure example of a base station device 20. The base station device 20 is, for example, a communication device and a transmission source communication device. The base station device 20 transmits a first signal and a second signal to a transmission destination communication device (not illustrated). Also, the base station device 20 is a communication device that transmits data.

The base station device 20 includes a transmission unit 21 and a control unit 22. The transmission unit 21 and the control unit 22 are implemented by, for example, a computer or a processor loading and executing a program, which is included in the base station device 20.

The base station device 20 performs a random access procedure when transmitting data to the transmission destination communication device. The random access procedure is a procedure for establishing wireless connection in wireless communication performed between the base station device 20 and the transmission destination communication device, and is performed when a data signal to be transmitted is generated or a case of establishing a synchronous state during handover.

The first signal is a signal that is used in the random access procedure by the base station device 20. The subheader corresponding to the first signal includes first information corresponding to information transmitted with the first signal. The first information is information that is used for establishing wireless connection in the random access procedure.

The second signal is a signal that is not used for the random access procedure, and is, for example, a signal for transmitting data.

The transmission unit 21 transmits the first signal and the second signal. The transmission unit 21 may transmit the first signal and the second signal at different timings or may simultaneously (consecutively) transmit the first signal and the second signal.

The control unit 22 may perform control so that the first information included in the subheader corresponding to the first signal is also transmitted to the subheader corresponding to the second signal. When the transmission unit 21 transmits the second signal at the same time as the transmission of the first signal, the control unit 22 causes the transmission destination communication device to recognize that the second signal (or information included in the second signal) is transmitted at the same time as the transmission of the first signal by transmitting the first information included in the subheader corresponding to the second signal (or repeatedly transmitting the subheader including the first information).

Figure 2:
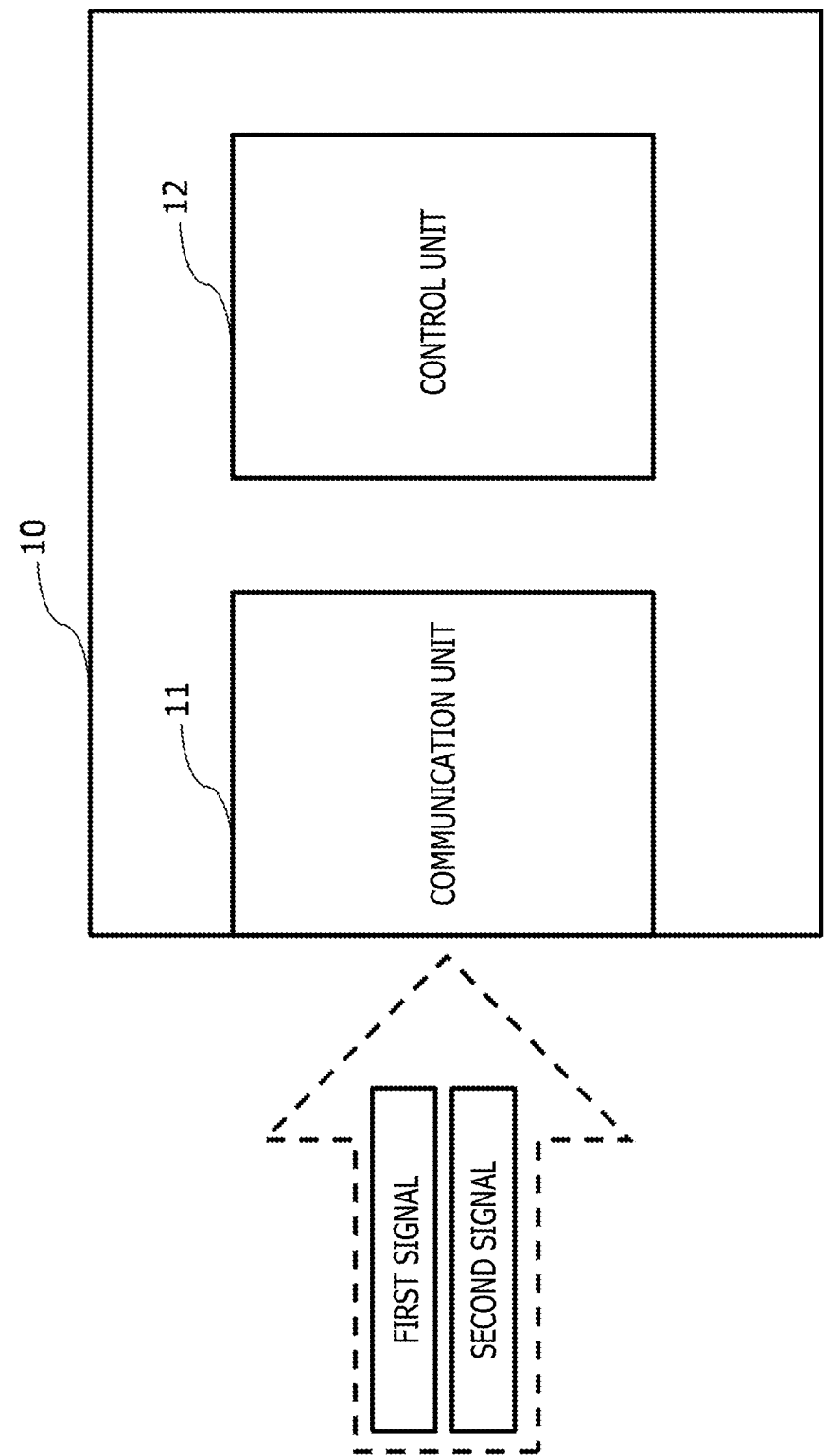
FIG. 2 illustrates a structure example of a communication device 10.

FIG. 2 is a diagram illustrating a structure of a communication device 10. The communication device 10 includes a communication unit 11 and a control unit 12.

The communication unit 11 receives a signal transmitted from the base station device 20. For example, the communication unit 11 receives the first signal or the second signal.

The control unit 12 controls the communication unit 11 to perform a signal process on the received signal. For example, when the first information is included in the subheader corresponding to the second signal, it is possible to recognize that the first signal and the second signal are simultaneously transmitted and control a data reception process such as a data composite process.

Note that, the data reception process is, for example, a process of performing data decoding for the second signal using information included in the second subheader and hybrid automatic repeat request (HARQ).

In the first embodiment, the base station device 20 may perform control so that the first information included in the subheader corresponding to the first signal is also transmitted by the subheader corresponding to the second signal, and cause the communication device 10 to recognize that the first signal and the second signal (or the information included in the second signal) are simultaneously transmitted. That is, since the base station device 20 performs control so that the first information included in the subheader corresponding to the first signal is also transmitted by the subheader corresponding to the second signal, the first signal and the second signal may be simultaneously transmitted, and it is possible to reduce the number of messages with the communication device 10. Accordingly, a time for the base station device 20 to transmit data to the communication device 10 is shortened, and a data transmission delay may be suppressed.

Second Embodiment

Next, a second embodiment is described below. The second embodiment may be understood as an example obtained by embodying the first embodiment. For example, the base station device according to the first embodiment may be considered as being equivalent to a base station device 200 according to the present embodiment. Also, for example, the communication device according to the first embodiment may be considered as being equivalent to a terminal device 100 according to the present embodiment.

<Structure Example of Communication System>

Figure 3:
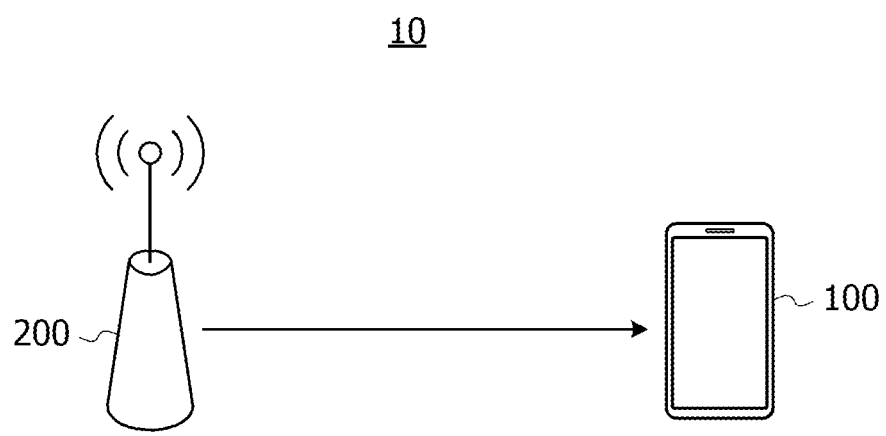
FIG. 3 illustrates a structure example of a communication system 30.

FIG. 3 is a diagram illustrating a structure example of a communication system 30. The communication system 30 includes a terminal device 100 and a base station device 200. The communication system 30 is, for example, a communication system for wireless communication conforming to 5G. In this case, the base station device 200 is, for example, a gNodeB in 5G. Also, the terminal device 100 is a device that performs communication with the base station device 200 or with another communication device through the base station device 200, and examples thereof include mobile communication terminals such as smartphones and tablet terminals. Note that, in the following description, the base station device 200 may be referred to as a transmission source communication device that is a transmission source of data, and the terminal device 100 may be referred to as a transmission destination communication device that is a transmission destination of data.

In the communication system 30, the base station device 200 and the terminal device 100 may establish wireless connection according to the random access procedure when data is transmitted from the base station device 200 to the terminal device 100, for example.

In the communication system 30, a channel for the random access procedure is prepared. In 3GPP, this channel is called a random access channel (RACH), and a communication start procedure using the RACH is called a random access procedure. The RACH includes information called a preamble as information for the base station device to identify a radio signal transmitted by the terminal device 100. Based on this information, the base station device 200 identifies the terminal device 100.

Examples of the random access procedure include a contention based random access procedure and a non-contention based random access procedure. When an opportunity to transmit downlink data (DL data) occurs at the time in an uplink out of synchronous state, the base station device 200 usually performs the non-contention based random access procedure. However, for example, when it is difficult to allocate a dedicated preamble due to a shortage of a dedicated preamble specific to a terminal or the like, control may be performed such that the contention based random access procedure is performed.

Figure 4:
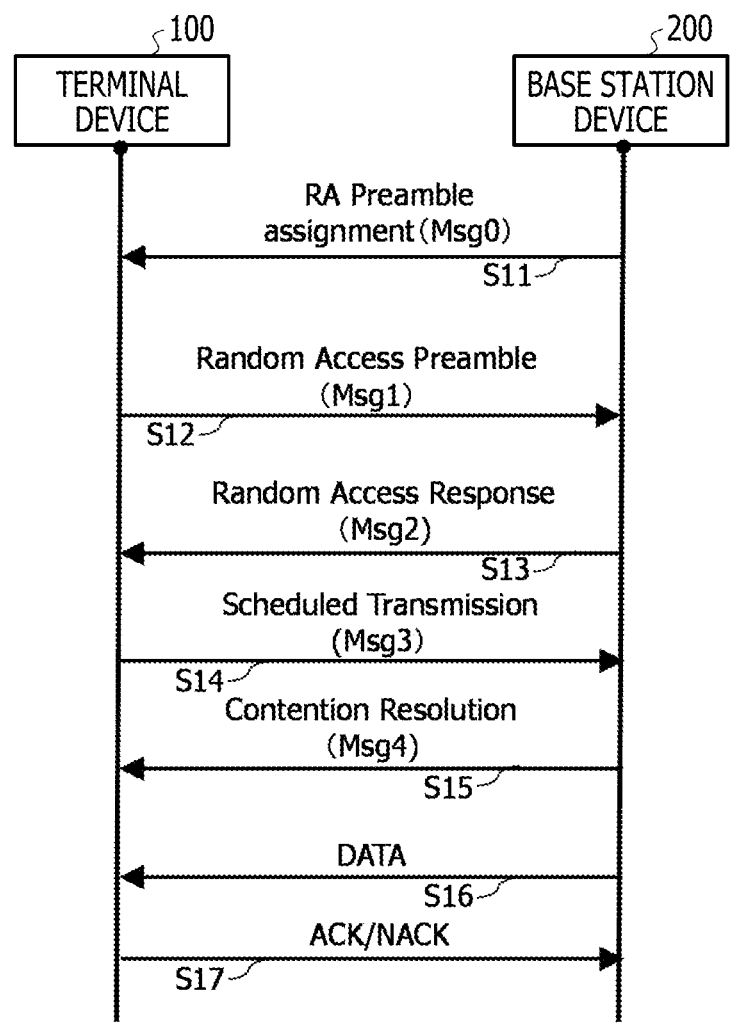
FIG. 4 is a sequence illustrating an example of a contention based random access procedure.

FIG. 4 is a sequence illustrating an example of a contention based random access procedure. The base station device 200 transmits a shared preamble allocated to the terminal device 100 with a random access preamble assignment (message 0: Msg 0) (S11). When the terminal device 100 receives the message 0, the terminal device 100 transmits a random access preamble (message 1: Msg 1) to the base station device 200 through the RACH (S12). When the base station device 200 receives the message 1, the base station device 200 transmits a random access response (message 2: Msg 2) that is a response signal for the message 1 to the terminal device 100 together with a synchronous signal, transmission grant, and the like for uplink communication (S13).

When the terminal device 100 receives the message 2, the terminal device 100 transmits a scheduled transmission (message 3: Msg 3) including an identifier or the like of a valid terminal device to the base station device 200 (S14). When the base station device 200 receives the message 3, the base station device 200 transmits a contention resolution (message 4: Msg 4) to the terminal device 100 (S15).

The base station device 200 transmits data (DL data) to the terminal device 100 using a radio resource established in the random access procedure (S16). The terminal device 100 transmits an acknowledgement (ACK) signal to the base station device 200 when the data is successfully received (S17), and transmits a non-acknowledgement (NACK) signal to the base station device 200 when the data is not received (S17).

Figure 5:
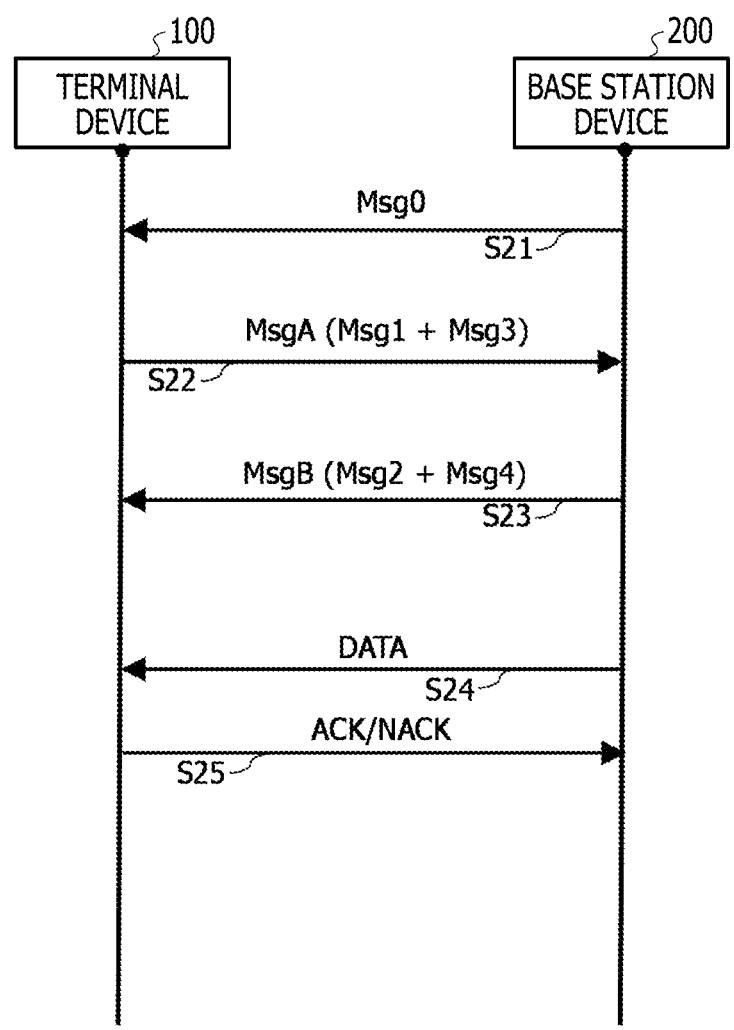
FIG. 5 is a diagram illustrating an example of a sequence of TSRA.

Also, the access procedure includes a 2-step random access procedure (hereinafter, the 2-step random access procedure may be referred to as TSRA) that can reduce the number of times of message transmission and reception by a part or all of individual messages in the sequence being simultaneously transmitted. FIG. 5 is a diagram illustrating an example of a sequence of TSRA.

The base station device 200 transmits the message 0 to the terminal device 100 (S21). When the terminal device 100 receives the message 0, the terminal device 100 transmits a message A (MsgA) including the message 1 and the message 3 to the base station device 200 (S22). When the base station device 200 receives the message A, the base station device 200 transmits a message B (MsgB) including the message 2 that is a response message of the message 1 and the message 4 that is a response message of the message 3 to the terminal device 100 (S23).

The base station device 200 transmits the data (DL data) to the terminal device 100 using a radio resource established in the TSRA (S24). The terminal device 100 transmits an ACK signal to the base station device 200 when the data is successfully received (S25), and transmits a NACK signal to the base station device 200 when the data is not received (S25).

As illustrated in FIG. 5, since the TSRA involves a smaller number of times of message transmission and reception than the contention based random access procedure illustrated in FIG. 4, it is possible to suppress a data transmission delay by shortening the time of the random access procedure.

Figure 6:
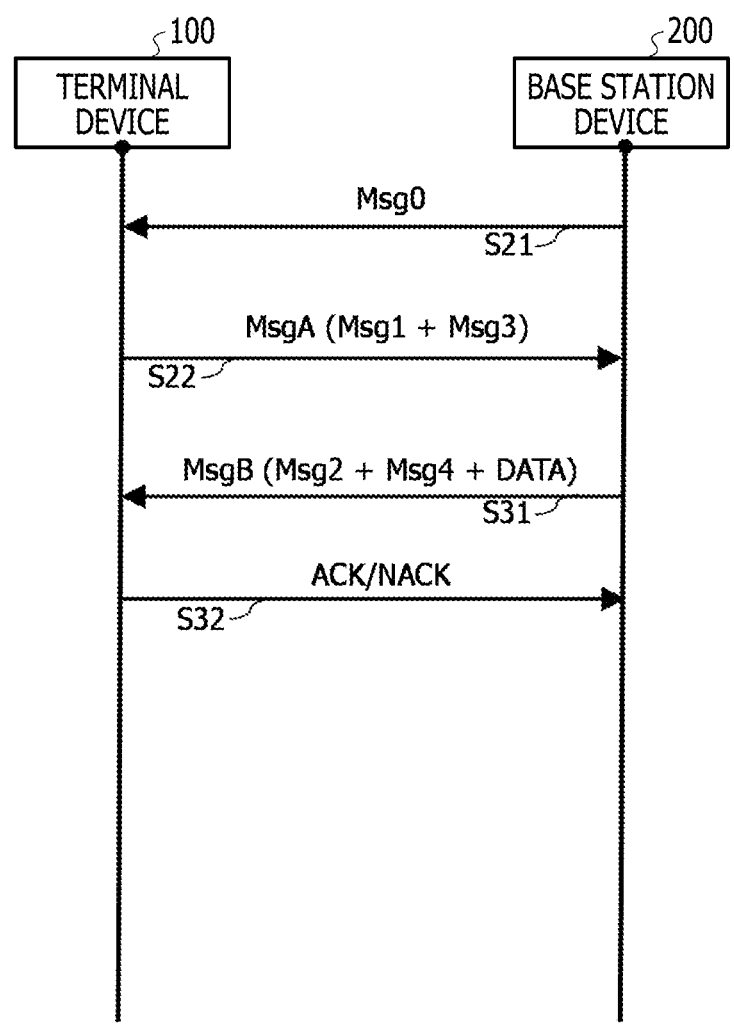
FIG. 6 is a diagram illustrating an example of a transformed sequence of TSRA.

In addition, furthermore, in order to reduce the number of times of message transmission and reception, there is a transformed sequence of the TSRA in which downlink data in the TSRA is included in the message B and transmitted. FIG. 6 is a diagram illustrating an example of an alternative sequence of the TSRA. Processes S21 and S22 in the sequence in FIG. 6 are the same as the processes S21 and S22 illustrated in FIG. 5.

When the based station 200 receives the message A, the base station device 200 simultaneously (or consecutively) transmits the message 2, the message 4, and furthermore data (second signal) to the terminal device 100 using the message B (first signal) (S31). The terminal device 100 transmits an ACK signal to the base station device 200 when the data is successfully received (S32), and transmits a NACK signal to the base station device 200 when the data is not received (S32).

In the alternative sequence of the TSRA, since only one message may be omitted as compared with the sequence of the TSRA illustrated in FIG. 6, it is possible to further shorten the time of the random access procedure and further suppress the data transmission delay.

In the random access procedure, carrier sense may occur when each message is transmitted in the contention based random access procedure using an unlicensed-free band (the unlicensed band may be referred to as a non-licensed band or an unlicensed band). When the carrier sense occurs, a delay until the completion of the transmission of data takes a longer time.

When a signal (a message or data) is transmitted using the unlicensed band, a communication device such as the base station device 200 or the terminal device 100 is demanded to perform carrier sense, confirm that there is no signal (or no data) (equal to or less than a predetermined reception power) in the unlicensed band, and transmit the signal. Therefore, when the number of times of message transmission and reception increases, the number of times of carrier sense also increases. Thus, a delay until the completion of the transmission of data increases.

Therefore, in the alternative sequence of the TSRA, When the unlicensed band is used, the number of times of carrier sense is reduced in addition to the reduction of the transmission and reception of messages in comparison with the other methods (FIGS. 4 and 5). Thus, it is possible to further suppress the data transmission delay.

<Structure Example of Base Station Device>

Figure 7:
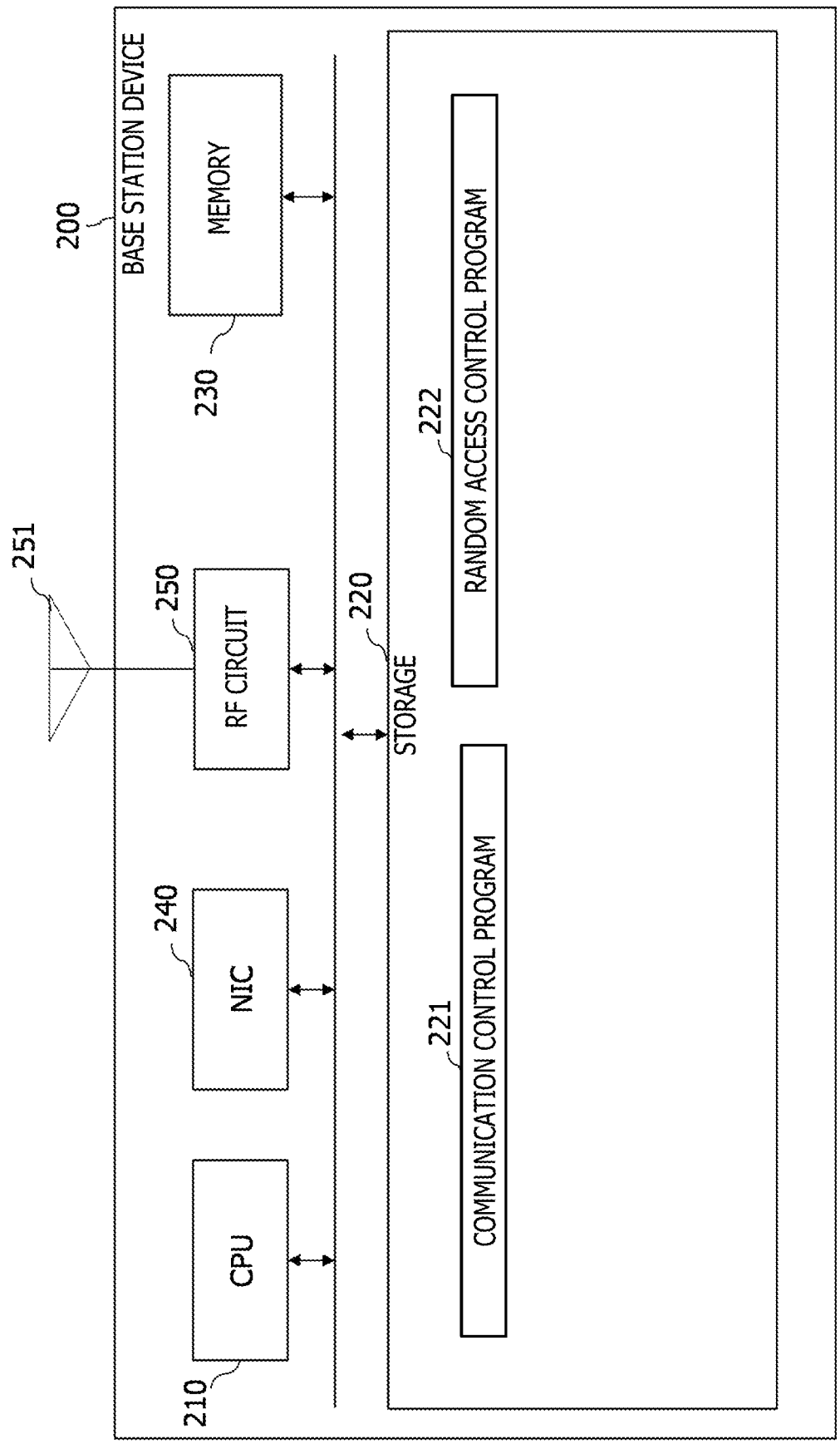
FIG. 7 is a diagram illustrating a structure example of a base station device 200.

FIG. 7 is a diagram illustrating a structure example of the base station device 200. The base station device 200 is, for example, a communication device, a transmission side communication device, and a transmission side device. The base station device 200 includes a central processing unit (CPU) 210, a storage 220, a memory 230 such as a dynamic random-access memory (DRAM), a network interface card (NIC) 240, and a radio frequency (RF) circuit 250. The base station device 200 is, for example, a transmission device that transmits data to the terminal device 100.

The storage 220 is an auxiliary storage device, such as a flash memory, a hard disk drive (HDD), or a solid-state drive (SSD), for storing programs and data. The storage 220 stores a communication control program 221 and a random access control program 222.

The memory 230 is an area into which programs stored in the storage 220 are loaded. The memory 230 is also used as an area in which a program stores data.

The NIC 240 is a network interface connected to a network (not illustrated) such as Internet or an intranet. The base station device 200 communicates with a communication device coupled to the network through the NIC 240.

The RF circuit 250 is a device wirelessly connected to the terminal device 100. The RF circuit 250 includes, for example, an antenna 251.

The CPU 210 is a processor or a computer, which loads programs stored in the storage 220 into the memory 230 and executes the loaded programs to implement each process.

The CPU 210 executes the communication control program 221 to implement the transmission unit and the control unit, and performs a communication control process. The communication control process is a process of controlling wireless communication with the terminal device 100.

The CPU 210 implements the transmission unit and the control unit by executing the random access control program, and performs a random access control process. The random access control process is a process of controlling a random access procedure between the terminal devices 100. In the random access control process, the base station device 200 selects, for example, a type (non-contention, contention, TSRA, transformed sequence of TSRA, or the like) of the random access procedure to be performed. Also, in the random access control process, the base station device 200 performs, for example, the selected random access procedure.

Note that, when the alternative sequence of the TSRA is selected in the random access control process, for example, the base station device 200 may select any one of the first format to the fifth format, which will be described below, or may use a format that is configured (determined) in advance.

<Structure Example of Terminal Device>

FIG. 8 illustrates a configuration example of the terminal device 100. Terminal device 100 is, for example, a second communication device, a reception side communication device, and a transmission party device. The terminal device 100 includes a CPU 110, a storage 120, a memory 130 such as a DRAM, and an RF circuit 150. The terminal device 100 is, for example, a reception device that receives data from the base station device 200.

The storage 120 is an auxiliary storage device, such as a flash memory, an HDD, or a SSD, for storing programs and data. The storage 120 stores a communication program 121 and a random access program 122.

The memory 130 is an area into which programs stored in the storage 120 are loaded. The memory 130 is also used as an area in which a program stores data.

The RF circuit 150 is a device wirelessly connected to the base station device 200. The RF circuit 150 includes, for example, an antenna 151.

The CPU 110 is a processor or a computer, which loads programs stored in the storage 120 into the memory 130 and executes the loaded programs to implement each process.

The CPU 110 executes the communication program 121 to implement the reception unit and the reception control unit, and performs a communication process. The communication process is a process of performing wireless communication with the base station device 200.

The CPU 110 implements the reception unit and the reception control unit by executing the random access program 122, and performs a random access process. The random access process is a process of performing a random access procedure selected by the base station device 200.

<Message Format in Alternative Sequence of TSRA>

In the alternative sequence of the TSRA, the communication system 30 defines a format of a subheader of a random access response (RAR) (information to be transmitted with the first signal) including (or associating) a data portion. A message format in the transformed sequence of the TSRA will be described below.

<1. First Format>

Figure 9A:
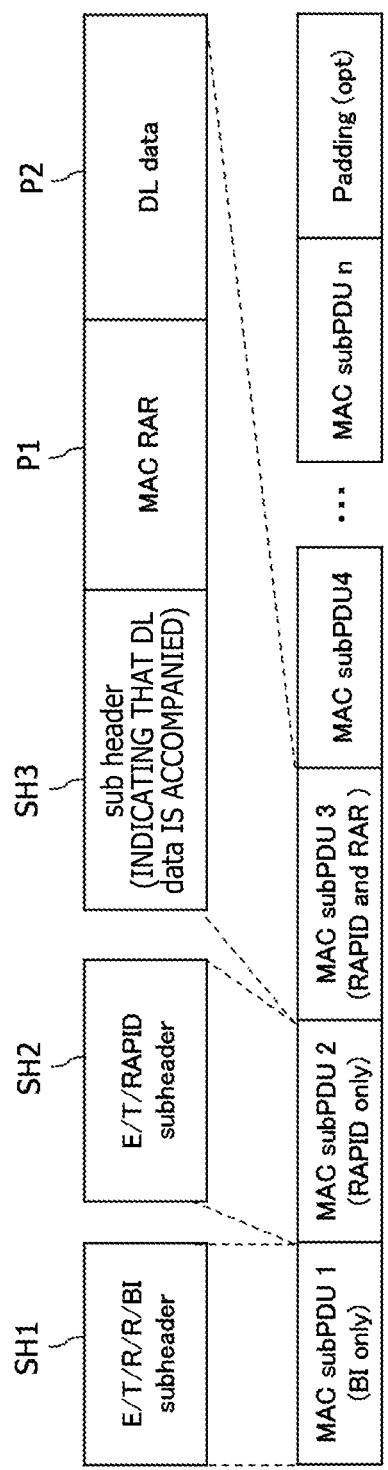
FIG. 9A to 9C are a diagram illustrating an example of subheaders of a first format.
Figure 9B:
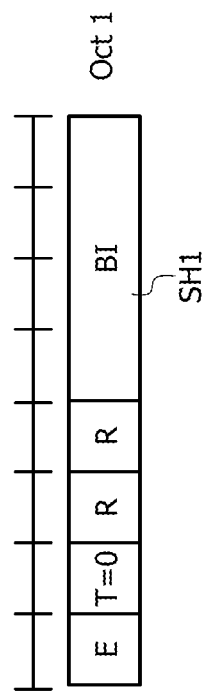
Figure 9C:
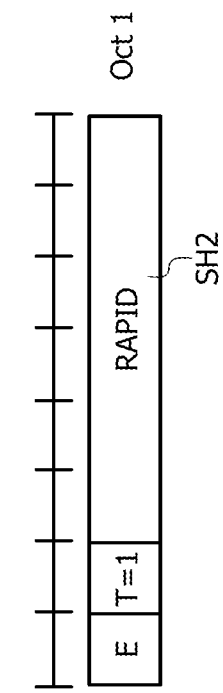

FIG. 9A to 9C are diagrams illustrating an example of subheaders of a first format. FIG. 9A is a diagram illustrating an example of a sub protocol data unit (subPDU) of a medium access control (MAC) layer including the subheader. Hereinafter, the subPDU of the MAC layer may be referred to as a MAC subPDU.

In FIG. 9A, the downlink signal includes a plurality of MAC subPDUs (n MAC subPDUs) and padding. For example, a subheader SH1 of a first MAC subPDU is an E/T/R/R/BI subheader indicating that a Backoff Indicator (BI) field is included. FIG. 9B is a diagram illustrating an example of the E/T/R/R/BI subheader. The E/T/R/R/BI subheader SH1 includes an extension (E) field, a type (T) field, 2-bit reserve (R) bits, and a BI field.

The E field is an extension field. For example, when the E field is "1" (ON), it indicates that a following E/T/RAPID subheader or the like following that is associated. When the E field is "0" (OFF), it indicates that padding or RAR is followed.

The T field is a type field. For example, when the T field is "0", it indicates that the BI field is included in the subheader. When the T field is "1", it indicates that the RAPID field is included in the subheader. In FIG. 9A, the T field is "0".

The BI field is, for example, an indicator indicating a random standby time until the next random access is attempted when a reply may not be received in the random access.

A subheader SH2 of a second MAC subPDU is an E/T/RAPID subheader indicating that a random access preamble identifier (RAPID) field is included. FIG. 9C is a diagram illustrating an example of the E/T/RAPID subheader. The E/T/RAPID subheader SH1 includes an E field, a T field, and a RAPID field. RAPID (first information) is an identifier of the random access preamble, and corresponds to the RAR to be transmitted. Also, in FIG. 9C, the T field is "1".

A subheader SH3 of a third MAC subPDU is a subheader indicating that downlink data (DL data) is associated. In the communication system 30, the subheader SH3 indicating that downlink data is included in a payload following that is defined.

By receiving the subheader SH3, the terminal device 100 may recognize that a payload P2 including the downlink data is associated after the payload P1 including the RAR, for example, and may acquire the downlink data.

<2. Second Format>

Figure 10:
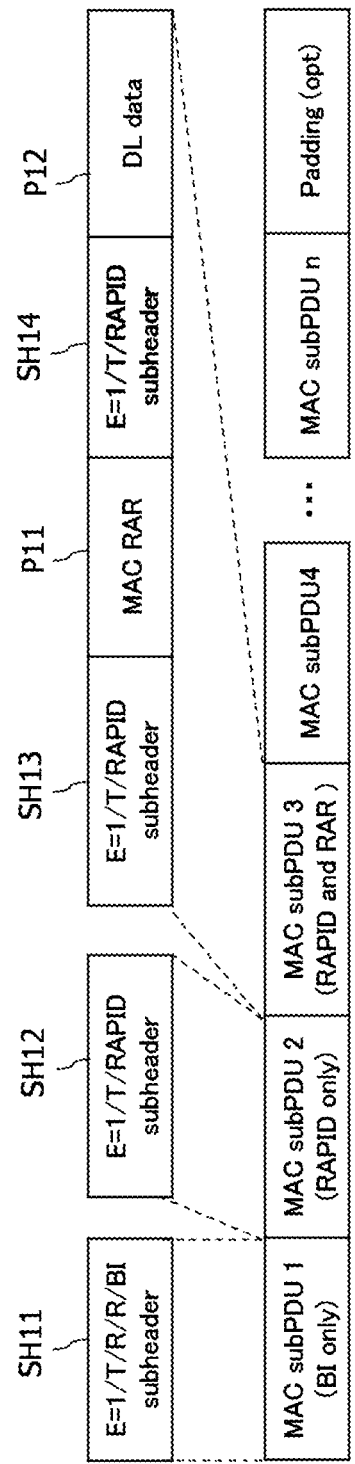
FIG. 10 is a diagram illustrating an example of a second format.

FIG. 10 is a diagram illustrating an example of a second format. The second format indicates that the downlink data is associated by repeating the E/T/RAPID subheader.

A subheader SH11 and a subheader SH12 are similar to the subheader SH1 and the subheader SH2 in FIG. 9. Note that each of E fields of the subheader SH11 and the subheader SH12 is "1".

An E field of the subheader SH3 of the third MAC subPDU is "1". Since the E field of the subheader SH3 is "1", the terminal device 100 recognizes that there is a subheader following that. The terminal device 100 acquires a subheader SH14 following a payload P11 including the RAR. When the terminal device 100 recognizes that the subheader SH14 is the repetition of the subheader SH13, the terminal device 100 may recognize that the subheader SH14 is followed by the payload P12 including the data. Accordingly, the terminal device 100 may acquire the downlink data.

<3. Third Format>

Figure 11:
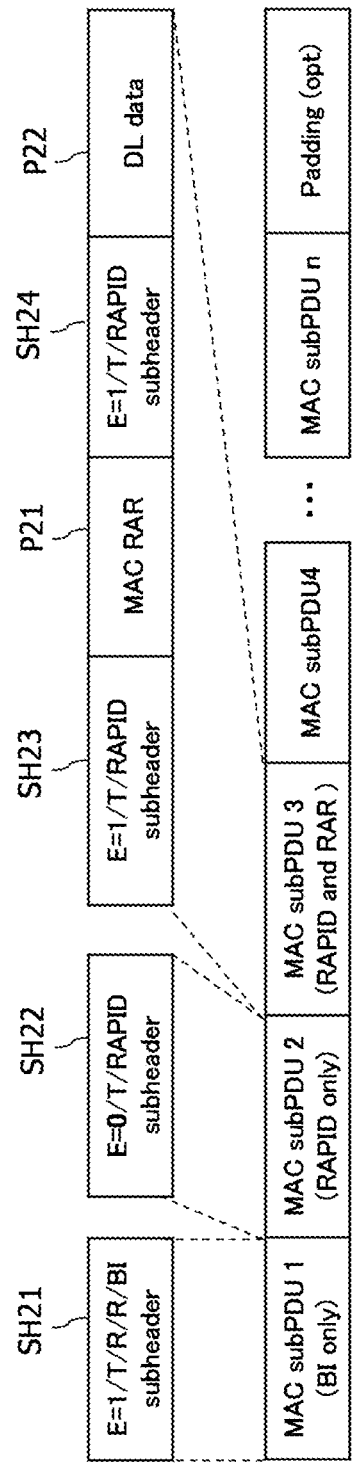
FIG. 11 is a diagram illustrating an example of a third format.

FIG. 11 is a diagram illustrating an example of a third format. The third format is an alternative example of the second format. In the third format, "0" is set to the E field in the subheader (that is a border of the existing RAR) before the subPDU including data.

A subheader SH21 is the same as the subheader SH11 in FIG. 10. Unlike the subheader SH12 in FIG. 10, the E field of a subheader SH22 is "0". Hereinafter, a subheader SH23, a payload P21, a subheader SH24, and a payload P22 are similar to the subheader SH13, the payload P11, the subheader SH14, and the payload P12 in FIG. 10.

In the terminal device 100, it is possible to simplify a decoding process by using the third format when the existing RAR and the RAR associating the data are multiplexed.

Figures 12A, 12B:
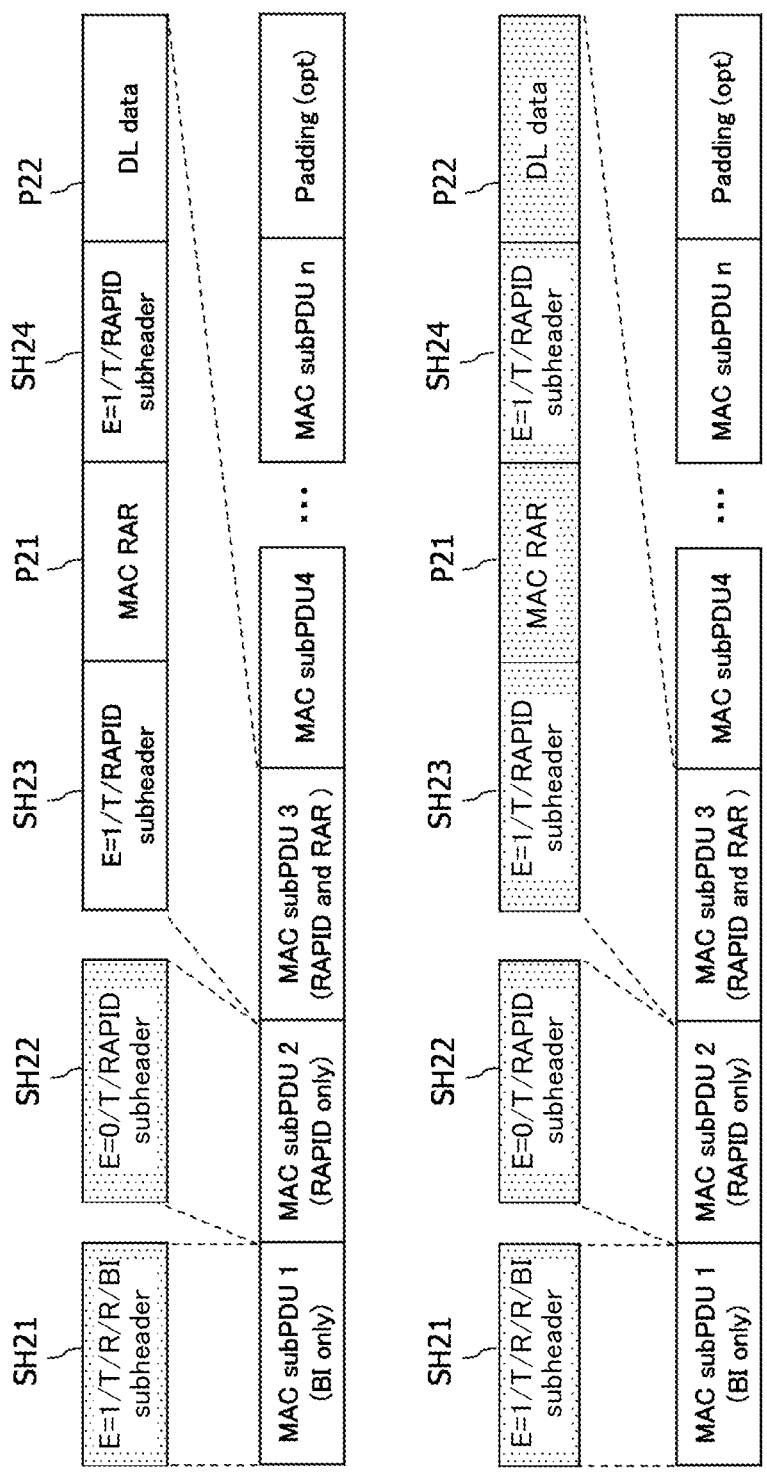
FIG. 12A to 12B are a diagram illustrating an example of a range of a decoding process performed by the terminal device 100 that deal with the third format and the terminal device 100 that does not deal with the third format.

FIG. 12A to 12B are diagrams illustrating an example of a range of the decoding process performed by the terminal device 100 that deal with the third format and the terminal device 100 that does not deal with the third format. FIG. 12A illustrates an example of the terminal device 100 that does not correspond to the third format, and FIG. 12B illustrates an example of the terminal device 100 that deal with the third format.

When the terminal device 100 (the existing terminal device) acquires the subheader SH22, the terminal device 100 (the existing terminal device) that does not deal with the third format treats the following subheader SH23, payload P21, subheader SH24, and payload P22 as, for example, padding since the E field is "0", and the subheader SH23, the payload P21, the subheader SH24, and the payload P22 are not subjected to a decoding process. That is, a range (shaded portions) from the beginning (the subheader SH21) to the subheader (the subheader SH22) in which the E field is "0" is subjected to the decoding process performed by the terminal device 100 that does not deal with the third format.

On the other hand, when the terminal device 100 (a new terminal device) acquires the subheader SH22, since the E field is "0", the terminal device 100 (a new terminal device) that deal with the third format recognizes that there may be RAR accompanying data thereafter. Then, the terminal device 100 acquires the subheader (the subheader SH23) of the RAR accompanying data, and the payload P21, the subheader SH24, and the payload P22 are subjected to the decoding process (shaded portions). Accordingly, the terminal device 100 may acquire the data.

As described above, by using the third format, the additional decoding process in the terminal device that does not correspond to the third format may be omitted.

Note that, in the third format, the subheader following the subheader SH22 in which the E field is "0" may be a R/R/Logical Channel Identifier (LCID) subheader instead of the E/T/RAPID subheader.

Figure 13:
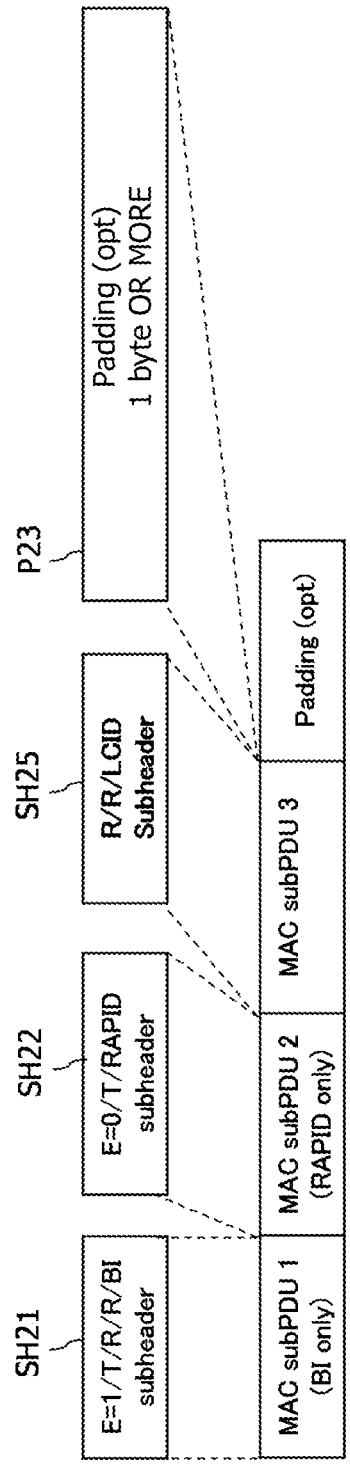
FIG. 13 is a diagram illustrating an example in which a subheader SH25 following that is a R/R/LCID subheader.

FIG. 13 is a diagram illustrating an example in which a following subheader SH25 is the R/R/LCID subheader. In the third format, when the terminal device 100 receives the subheader SH22 in which the E field is "0", the terminal device 100 determines whether the subheader following that is the E/T/RAPID subheader or the R/R/LCID subheader. The terminal device 100 performs a subheader type determination process S100.

FIG. 14 is a diagram illustrating an example of a process flowchart of the subheader type determination process S100. The terminal device 100 awaits a subheader that appears following the subheader in which the E field is "0" (No at S100-1). Then, when the terminal device 100 acquires the subheader that appears following the subheader in which the E field is "0" (Yes at S100-1), the terminal device 100 confirms whether or not the second bit of the acquired subheader is ON (1) (S100-2).

When the second bit is ON (Yes at S100-2), the terminal device 100 determines that a subheader is the E/T/RAPID subheader (S100-3).

On the other hand, when the second bit is not ON (No at S100-2), the terminal device 100 determines that a subheader is the R/R/LCID subheader (S100-4).

Referring back to FIG. 13, since the second bit of the subheader SH25 is "0" and is not ON, the terminal device 100 determines that the subheader SH25 is the R/R/LCID subheader.

In this manner, in the third format, by confirming the second bit of the subheader, the terminal device 100 may classify whether the subheader is the E/T/RAPID subheader or the R/R/LCID subheader.

Figure 15A:
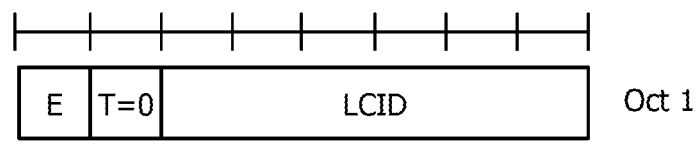
FIG. 15A to 15B are a diagram illustrating examples of formats of redefined subheaders.
Figure 15B:
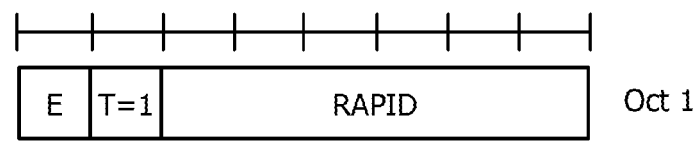

Note that the E/T/R/R/BI subheader may not be set following the subheader in which the E field is "0". Therefore, the T field may be redefined. FIG. 15A to 15B are diagrams illustrating examples of formats of redefined subheaders. FIG. 15A illustrates an example of a subheader including the LCID, and FIG. 15B illustrates an example of a subheader including the RAPID.

As illustrated in FIG. 15A, when the T field is "0" in the subheader following the subheader in which the E field is "0", the last six bits are defined as the LCID. Also, as illustrated in FIG. 15B, when the T field is "1" in the subheader following the subheader in which the E field is "0", the last six bits are defined as the RAPID.

Note that, even when the T field is redefined as illustrated in FIG. 15, the terminal device 100 may determine whether the subheader is the E/T/LCID subheader or the E/T/RAPID subheader by confirming the second bit.

Figure 16:
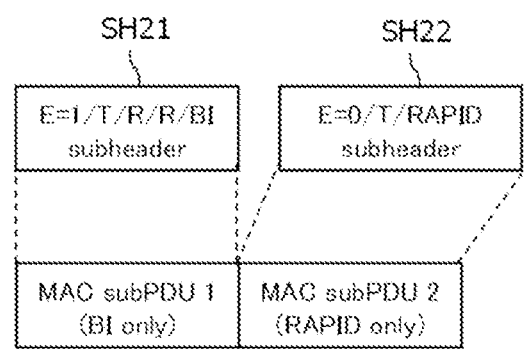
FIG. 16 is a diagram illustrating an example without padding.

Also, when padding is not demanded to follow, the terminal device 100 interprets "0" of the E field included in the subheader SH22 as the tail. FIG. 16 is a diagram illustrating an example without padding. As illustrated in FIG. 16, when there is no data following the subheader SH22, the "0" of the E field included in the subheader SH22 is determined that there is no following data (that is, the tail), by the terminal device 100.

<4. Fourth Format>

Figure 17:
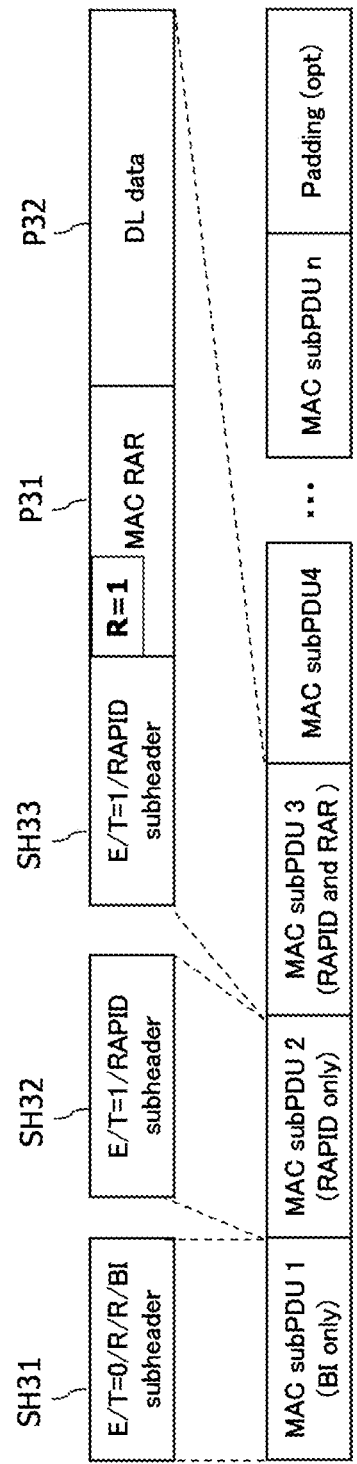
FIG. 17 is a diagram illustrating an example of a fourth format.

FIG. 17 is a diagram illustrating an example of a fourth format. A subheader SH31, a subheader SH32, a subheader SH33, and a payload P32 in FIG. 17 are similar to the subheader SH11, the subheader SH12, the subheader SH13, and the payload P12 in FIG. 10.

In the fourth format, it is defined that one of the R bits in the payload P31 including the RAR is used as a bit indicating whether or not the data following that is included. For example, when the defined R bit in the payload P31 is ON (1), this indicates that there is data following the RAR. As illustrated in FIG. 17, the terminal device 100 confirms that the defined R bit of the payload P31 including the RAR is "1", and recognizes that there is the payload P32 including the data following that.

<Fifth Format>

Figure 18:
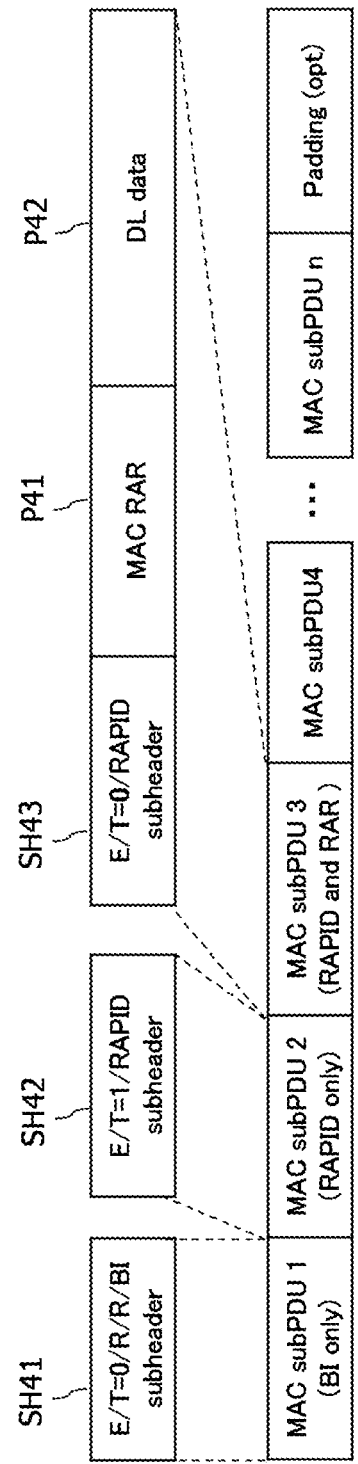
FIG. 18 is a diagram illustrating an example of a fifth format.

FIG. 18 is a diagram illustrating an example of a fifth format. The fifth format allows "0" to be set in the T field of the E/T/RAPID subheader that appears in the middle (that appears at a position other than the beginning). When the T field in the subheader appearing in the middle is "0", the case indicates that the data is associated.

A subheader SH41 and a subheader SH42 are similar to the subheader SH1 and the subheader SH2 in FIG. 9. Also, a payload P41 and a payload P42 are similar to the payload P1 and the payload P2 in FIG. 9.

A T field of an E/T/RAPID subheader SH43 is "0". Since the terminal devices has already received that T field is "0" at the subheader SH41, the terminal device 100 recognizes that "0" of the T field in the subheader SH43 is the second reception ("0" of the T field appears in the middle), and recognizes that data is associated following that. In other words, the terminal device 100 recognizes a format different from the existing format by permitting "0" of the T field for the E/T/RAPID subheader located in the middle. The terminal device 100 acquires data included in the payload P42 following the payload P41 including the RAR.

Note that, in order to allow "0" for the T field of the E/T/RAPID subheader, there is a condition in which the E/T/R/R/BI subheader appears at the beginning. However, since a numerical value specified in the BI field is an index corresponding to a random standby time (backoff parameter value) until the next random access is attempted when there is no response to the random access, a subheader including the BI field may not be set (transmitted) when the standby time is 0. Therefore, 0 of the standby time is defined as one index.

FIG. 19 is a diagram illustrating an example of parameters of backoff parameter values. For example, the indices and backoff parameter values set in the BI field are defined in TS38.321 Subclause 7.2. In FIG. 19, "0" of the backoff parameter value (standby time) is newly defined in an index 14 that has been defined as Reserved.

Other Embodiments

The above described data may be, for example, user date or MAC Control Element (CE). The format of MAC CE is described in, for example, TS38.321 FIG. 6.1.2-4. The base station device 200 may simultaneously transmit, for example, Cell Group (CG) activation MAC CE with the message B. Accordingly, the time until the transmission of the MAC CE message is completed may be shortened, and the data transmission delay may be suppressed.

Also, the embodiments may be combined with each other. In the communication system 30, the terminal device 100 and the base station device 200 may correspond to any one of the first format to the fifth format, or may correspond to a combination of two or more of formats. In addition, in the communication system 30, the terminal device 100 and the base station device 200 may use different message formats, for example, according to a radio wave state (the degree of interference, the received power, or the like).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device that performs a random access procedure, the communication device comprising:
   a transmitter configured to transmit a first signal in the random access procedure and a second signal which is not a signal of the random access procedure; and
   controller circuitry configured to:
      perform control so that first information included in a first subheader corresponding to the first signal is included in a second subheader corresponding to the second signal and is transmitted; and
      perform control so that a value of a second bit of the first subheader is set to 0, wherein the value of 0 indicates that the first signal and the second signal are simultaneously transmitted.

2. The communication device according to claim 1, wherein the controller circuitry controls the first signal and the second signal to be simultaneously transmitted according to information included in the second subheader.

3. The communication device according to claim 1, wherein
the first signal is a message for transmission of a random access response,
the second signal is a message for transmission of data to a transmission destination communication device of the communication device, and
the first information includes a random access preamble identifier.

4. The communication device according to claim 1, wherein
the controller circuitry controls so that the first subheader is placed in a subheader other than a head subheader.

5. A second communication device that performs a random access procedure, the second communication device comprising:
a receiver configured to receive a first signal in the random access procedure and a second signal that is not a signal of the random access procedure; and
reception controller circuitry configured to recognize reception of the second signal when a second subheader corresponding to the second signal, which includes first information included in a first subheader corresponding to the first signal and corresponds to the second signal, is received,
wherein the receiver is configured to receive the first information in which a value of a second bit of the first subheader is set to 0, wherein the value of 0 indicates that the first signal and the second signal are simultaneously transmitted.

6. The second communication device according to claim 5, wherein
the controller circuitry determines whether or not the first signal and the second signal are simultaneously transmitted according to information included in the second subheader.

7. The second communication device according to claim 5, wherein
the first signal is a message for transmission of a random access response,
the second signal is a message for transmission of data to a transmission destination communication device of the communication device, and
the first information includes a random access preamble identifier.

8. The second communication device according to claim 5, wherein
the first subheader is placed in a subheader other than a head subheader.

9. A communication system comprising:
a transmission source communication device and a transmission destination communication device configured to perform a random access procedure,
wherein the transmission source communication device includes
a transmitter configured to transmit a first signal in the random access procedure and a second signal that is not a signal of the random access procedure, and
controller circuitry configured to:
perform control so that first information included in a first subheader corresponding to the first signal is included in a second subheader corresponding to the second signal and is transmitted; and
perform control so that a value of a second bit of the first subheader is set to 0, wherein the value of 0 indicates that the first signal and the second signal are simultaneously transmitted, and
the transmission destination communication device includes
a receiver configured to receive the first signal and the second signal, and
reception controller circuitry configured to recognize reception of the second signal when the second subheader is received.

10. A communication method for a communication device that performs a random access procedure, the method comprising:
transmitting a first signal in the random access procedure and a second signal that is not a signal of the random access procedure;
performing control so that first information included in a first subheader corresponding to the first signal is included in a second subheader corresponding to the second signal and is transmitted; and
performing control so that a value of a second bit of the first subheader is set to 0, wherein the value of 0 indicates that the first signal and the second signal are simultaneously transmitted.

\* \* \* \* \*